INVENTOR
GEORG STAUDINGER
BY
ATTORNEY

INVENTOR
GEORG STAUDINGER
BY
ATTORNEY

July 20, 1937. G. STAUDINGER 2,087,584
APPARATUS FOR MEASURING THE PRESSURE IN THE SURFACE OF CONTACT
BETWEEN A YIELDING AND SUBSTANTIALLY UNYIELDING BODY
Filed June 13, 1934 3 Sheets-Sheet 3

INVENTOR
GEORG STAUDINGER
BY
ATTORNEY

Patented July 20, 1937

2,087,584

UNITED STATES PATENT OFFICE 2,087,584

APPARATUS FOR MEASURING THE PRESSURE IN THE SURFACE OF CONTACT BETWEEN A YIELDING AND SUBSTANTIALLY UNYIELDING BODY

Georg Staudinger, Frankfort-on-the-Main, Germany

Application June 13, 1934, Serial No. 730,460
In Germany June 20, 1933

11 Claims. (Cl. 73—151)

The invention relates to an apparatus for measuring the fields of pressure which exist at the surfaces of contact between elastic bodies of different degrees of elasticity and non-elastic bodies, for example between the sole of the foot and the surface on which it is supported.

In so far as a more or less elastic deformable body and a substantially rigid body are in contact with one another, the former clings to the surface of the rigid body, according to the particular conditions, over a surface which is more or less extended and is generally of a complicated shape or is sub-divided into a number of areas of contact. The distribution of the pressure on this surface can only be determined with difficulty. Thus, for example, numerical values for the distribution of pressure over the surface of contact of a rubber pneumatic tire on a loaded vehicle with a smooth and rigid supporting surface can be calculated if certain assumptions be made, but it has not hitherto been possible to prove experimentally the result of the calculation.

The analytical method is, however, quite unsuitable if the elastic conditions become more complicated. Even in the case of toroid rubber tires the mathematical relationships are so involved that to calculate them practically is impossible. This method, however, is absolutely useless when the elastic bodies are of a complicated structure and composed of elements which are not built-up in a simple manner and have greatly differing degrees of elasticity, such as for example parts of the body of human beings or animals.

It is just this latter case, however, which is of great practical interest for medical purposes. It is only necessary to recall the many ailments, for example of the foot, which are due to pressure and affect both the soft parts as well as the bone and generally arise from the size, position or setting of some or all the parts of the bone structure differing from the normal, although these parts may often be remote. In such cases it becomes an urgent necessity both for the experimenter as well as for the healing practitioner to ascertain by measurement the pressure distribution on the supporting surface both in the case of the healthy foot as well as in the case of the abnormal or unhealthy foot and to determine how this distribution depends on the position, posture or loading of the limb and how it is affected also by supporting means or in consequence of a plastic operation. The ailments due to pressure on the skin from which bed-ridden patients suffer or to prothesis pressure which affects the stump left after amputation belong to the same category.

There have, of course, been no lack of experiments which were made in an endeavor to solve this problem, but the experiments have not resulted in more than purely qualitative or crude quantitative determinations being obtained. It is obvious that nothing can be learned regarding the distribution of the pressure by determining the shape of the surface of contact by coloring the surface of the part of the skin to be tested and pressing it against a rigid support.

It has been suggested to place the foot to be measured on a glass plate and to determine the distribution of pressure from the removal of blood from the capillaries of the skin of the sole and from the paling of the skin. This method was not satisfactory, because it introduced numerous sources of error and did not permit numerical determination of the pressure from point to point. It has been also proposed to provide a support for the foot comprising a paper sheet, a layer of flannel saturated with a solution of methylene blue underneath the sheet, and a wire netting of close meshes arranged between the sheet and the layer of flannel. The pressure of the foot caused parts of the paper to protrude through the meshes and to be colored by the methylene blue. Of course, no reliable and quantitative results could be obtained in this manner. Recently, it has been attempted to use a string dynamometer for measuring the pressure, however, without being able to determine pressure at definite points. As far as I am aware, none of the numerous proposals and suggestions has provided the art with a solution of the outstanding problem or has been completely satisfactory and successful.

In practice, however, a further requirement which can be satisfied by none of the said methods must be met and this is the determination of the exact relationship between the field of pressure and the anatomically determined points of the bone structure.

By means of the apparatus according to the present invention, the errors which are unavoidable with the methods which have been mentioned are entirely obviated and scientifically accurate measurements can be obtained. The principle of the apparatus consists essentially in that one or more elements of the surface of the non-elastic surface are replaced by one or more relatively small measuring devices, care being taken during the measuring process that the surface of contact is unaltered or alters only to an extent which is practically negligible and that each point of the field to be measured is accessible to the measuring instruments, so that instruments which can be moved in all directions can be employed.

A preferred embodiment of an apparatus for carrying out the method in accordance with the invention is illustrated by way of example in Figures 1 and 2 of the accompanying drawings, in which:—

Figure 1:
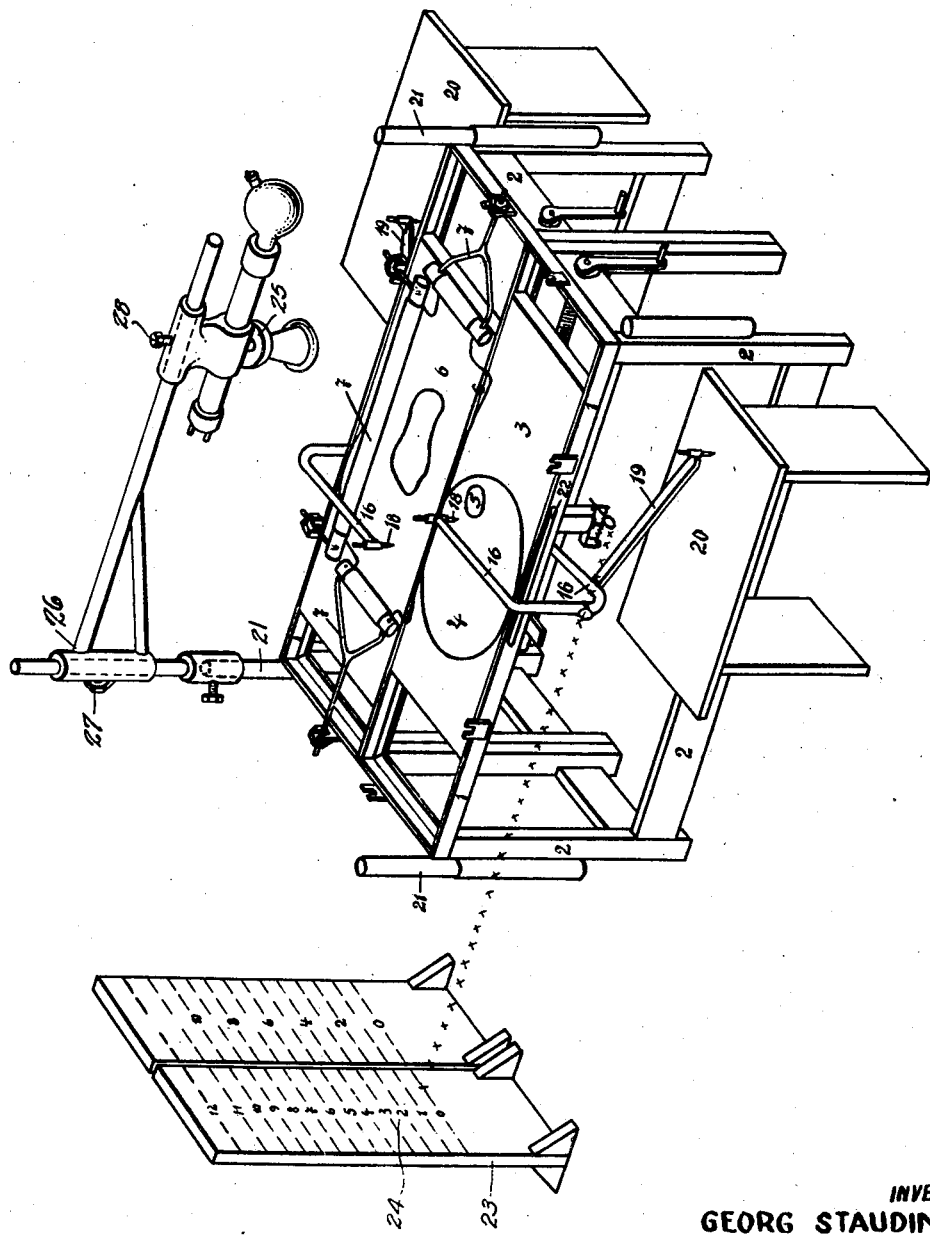
Figure 1 is a perspective view of a double form of measuring machine which gives a simultaneous indication of the fields of pressure of both feet of a patient.

Referring to the drawings, the apparatus consists essentially of a horizontal frame 1 of angle iron which is fixed to a wooden frame 2. In the frame 1 is mounted a plate 3 which can be shifted forwards and backwards. In this movable plate 3 is inlet a rotatable disc 4 and in this disc the member 5, which is employed for measuring the individual pressures which are in this case directed vertically downwards.

This arrangement not only enables the measuring device to be brought to any point on the pressure surface to be tested but two of these apparatus can be placed so close together, without interfering with one another, that both feet of the same person can be tested independently and if necessary simultaneously.

The surface of the member 5, the disc 4 and the plate are situated in a plane when the portion of the body to be tested rests in one plane. If, however, it is desired to measure the foot on a support or the like, the plane would then be replaced by a correspondingly shaped surface.

Over this plane is stretched, by means of a tensioning device 7, a sheet of paper 6 which is firmly connected by means of the tensioning device to the frame. The foot or other part of the body to be tested is then placed on the paper.

The paper prevents the skin from being dragged along by the measuring plate. On the other hand, the material of the paper is such that the pressure is not materially affected.

The paper is wound on three sides on rods the ends of which are connected to the frame and held thereto under tension, while the middle side of the paper is wound round a semi-circular bar and is pressed together with the bar into a groove at the side of the wooden frame.

The arrangement described has been selected in order that two apparatus, for example for the right foot and for the left foot, can be placed close together, and the two apparatus can also be employed for testing the feet in a transverse position.

The member 5 is for the purpose of measuring the pressure on the supporting surface. It can, of course, be constructed in various ways and the measurement can be carried out in any desired manner.

The deflection of or indication obtained by the measuring instrument may, for example, be mechanically enlarged directly by means of a system of levers or read off through the agency of a system of mirrors.

The displacements at the place of measurement which can take place according to the first mentioned method can easily be kept below 1/100 mm., so that inaccuracies cannot thereby be introduced into the result of the measurement.

In the apparatus illustrated the mirror method is employed in the following manner:—

Figures 2, 3:
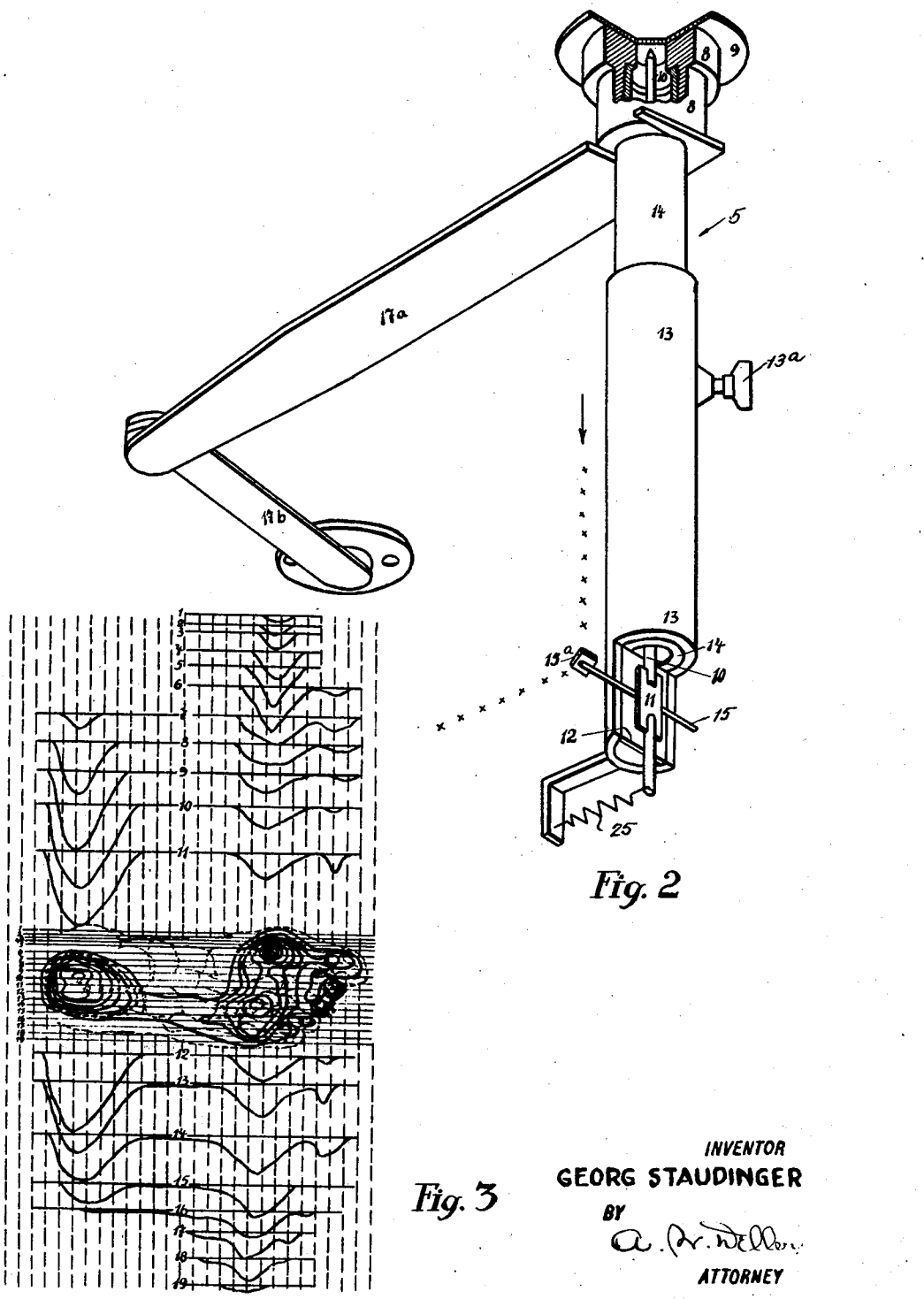
Figure 2 shows on a greater scale a perspective view of the instrument for transmitting the measurements.
Fig. 3 illustrates the graphical method used for obtaining a diagram from the pressure curves.

The measuring member 5 shown in Figs. 1 and 2 essentially comprises supporting member 8 mounted on the end of tube 14. Supporting member 8 is provided with a flange-like extension to which a membrane or diaphragm 9 is secured. The diaphragm is preferably made of a material of high resiliency, for example steel, which is deformed by the pressure to be measured. The degree of this deformation forms the basis of the measurement.

To the centre of the membrane or diaphragm is riveted, as shown in Figure 2, a vertical downwardly directed rod 10, the free lower end of which carries a small metal plate 11. The upper end of rod 10, riveted to the center of diaphragm 9, ends in a point. Due to the pointed end contact between diaphragm 9 and rod 10, the displacement of the rod will be identical with the displacement or depression of the center portion of the diaphragm and will permit accurate measurement of the pressure at that point. Parallel to this plate 11 and at a distance of 0.4 mm. from it is mounted a second plate 12 which is rigidly connected across the cut up part of tube 13. Between the two metal plates a thin needle 15 is clamped in a horizontal position and a small mirror 15a is fixed to one end of the needle. A light spring 25 provides slight pressure of the movable plate 11 on needle 15 and stationary plate 12.

Tube 13 is slidably arranged on tube 14 and is capable of a limited longitudinal and rotary displacement thereon whereby the initial position of mirror 15a with respect to the upright chart 24 may be accurately adjusted. A set screw 13a is provided on tube 13 to lock the same after the correct adjustment has been obtained.

If now, owing to the bending of the diaphragm 9 the two plates are relatively shifted, the needle, and therefore the mirror, is rotated. A ray of light which falls on the mirror is, therefore, deflected in accordance with the rotation. The deflected ray falls on upright chart 23 provided with a scale 24 and is read off on the scale. The scale is arranged at a constant distance from the measuring member 5 so that the transmission ratio remains unaltered. This constant distance may be maintained in a number of different ways, for example, by arranging the upright chart on a slide and connecting same to the measuring member by means of a spacing member. Being obvious to those skilled in the art and for the sake of simplicity this arrangement has been omitted from the drawings. The measuring member, however, takes part in the rotation of the circular disc about a vertical axis on passing from one measuring position to another. By means of a suitable apparatus, in this case the links 17a and 17b, care is taken that the deflected ray used for measuring always falls on the measuring division which is arranged vertically at a fixed distance.

It has proved advantageous in practice to connect the links 17a and 17b or the measuring member with a holder 16 which is situated above the member and the part of the body to be tested, which holder is provided with a movable pointer 18 which always points to the middle of the membrane or diaphragm. By this means the position of the measuring member can be located, in case the diaphragm is covered by the part of the body during the measurement.

To the holder 16 there is again fitted a leaf spring 19 provided with a fine needle which moves over the stool 20, over which a piece of paper is stretched, in accordance with the movements of the measuring member.

The needle connected to spring 19 draws lines on surface 20 corresponding to the displacements of the measuring member 5 during the measuring process. Each point of this line is marked with the numerical value of the pressure on that particular point according to the readings taken on the scale 24 and indicated by the deflected light ray.

In order that the part of the body which is to be measured may be fixed in the position which it has once assumed, there is employed, for example when testing the feet, a fixing device comprising four rods 21 which are fixed at the four corners of the frame and are connected together by cross-bars.

These cross-bars (not shown in the drawings) may be associated with conventional supporting or fastening means maintaining the object to be measured stationary until the measurement is finished, as those skilled in the art will readily understand.

Before or after the actual testing of the part of the body, for example the foot, this can be in addition examined or photographed by means of Röntgen rays without its position being altered. For this purpose, instead of the plate 3, there is inserted another plate provided with Röntgen film or paper and the Röntgen exposure is then made. One of rods 21 carries a horizontal supporting member 26 which holds an X-ray tube 25 above the platform. The position of the X-ray tube with respect to the foot may be readily adjusted by displacing the supporting member on the rod and the X-ray tube on the horizontal supporting member. After the desired adjustments have been made, the supporting member and the tube are secured in their respective positions by means of screws 27 and 28.

The correspondence between the Röntgen or X-ray photograph and the pressure diagram may be obtained in a number of different ways. For example, a marking device may be provided which is adapted to indicate on a photographic film or plate the position of the foot corresponding to the position of the foot on the pressure diagram. This can be accomplished by means of holder 16, carrying a pointer or needle 18 at the end thereof which directly points to the center of the measuring diaphragm 5. All points which are marked by means of pressure on platform 3, can be simultaneously and correspondingly marked by a needle at the end of arm 19 on a sheet of paper on stool 20. If an X-ray film is now inserted into slot 22, by pressing needle 18 against the film and thereby at the same time pressing with the other needle at the end of arm 19 against the sheet of paper on stool 20, absolute correspondence between the picture on the film and the pressure diagram on the paper sheet may be obtained. Instead of this, however, an angle can be placed against the foot to be tested which is fixed when it touches the foot at three points. The position of the angle relatively to the measuring surface can be marked once and for all. Then, when the Röntgen ray exposure is made at another time and at another place if the exposure of the foot to be tested is made with the angle in the same position, this exposure can be exactly oriented relatively to the pressure exposure by means of the shadow of the angle piece without special marks on the angle piece being necessary. Obviously, two angles, namely one for each foot, could be employed.

The measurement by means of the apparatus is carried out by drawing the measuring member from the front to the back under the foot. A curve is thus obtained which corresponds to the various pressures on the sole of the foot and indicates the pressure of the sole of the foot as a function on the measuring line. By laterally displacing the measuring member and again drawing it backwards from the front, a fresh measuring line is again obtained. It will be clear that in this way any desired point on the part of the body which it is desired to measure can be tested.

If now the points of equal pressure on the various measuring lines are joined, lines of equal pressure (isobars) are obtained. These are shown in Figure 3 and are similar to the isobars on weather charts. After all the lines of equal pressure have been formed the complete figure produced gives a diagram of the distribution of pressure over the entire sole of the foot. The accuracy of the diagram can be increased on the one hand by the use of as many measuring lines as possible, and as many lines as possible on the other hand.

By means of the apparatus which has been described, it is possible not only to settle the controversy which has continued since 1855 regarding the supporting points of the foot but it is also possible to divide up the entire foot into its individual supporting areas.

It is also possible, with this apparatus, to measure the pressure conditions of the foot with the body in any desired position.

The invention appears to be of particular importance because it is possible by means of this apparatus not only to produce an exact numerical representation of the areas of pressure, but especially because it is possible, for the first time, to transfer the results obtained to the bone structure. It is not sufficient simply to know when part of the foot takes the main part of the load or how the load is distributed over the foot, since even if such results can be obtained it is still not possible to ascertain how these pressures correspond with the bone structure of the foot.

The transfer of a point on the sole of the foot to the bone structure, i. e. to ascertain the part of the bone structure to which a point on the foot corresponds, is much more difficult than has been generally assumed. Even if, as has been done by previous investigators, the measured points on the sole of the foot are marked on the assumption that these points are situated exactly under the parts of the bone structure to be measured, these marked points no longer lie exactly under the part of the bone structure to be measured when there is a load on the foot. Any attempt to do this has, however, never yet been made. Every bone structure yields when subjected to load according to the pressure applied and its elasticity and alters somewhat in length and in width whereas the marked point is fixed on the smooth support or, for example, on the network. In any case, the bone structure becomes displaced relatively to the soft parts on which the points have been fixed. Quite apart from other errors which were contained in the previous measurements, the fact that these points could never be made to correspond with the bone structure gave rise to a second large error.

Quite apart from this the attempt has never been made up to the present time, and this must be expressly emphasized, to transfer the results obtained or the diagrams produced to the bone structure. There is, therefore, a great difference between the former pressure measuring devices and the apparatus which has just been described, namely that in the first place the measurement is scientifically accurate and secondly this accurate measurement can be directly transferred to the bone structure.

Figure 4:
Fig. 4 depicts an impression of a foot made by one of the conventional methods.

Figures 4 to 7 explain the difference between the results obtained by the known devices and by the apparatus according to the invention. Figure 4 shows a picture of a foot which was obtained by the impression method by means of printing paper. In this, only the entire surface of contact can be recognized.

Figure 5:
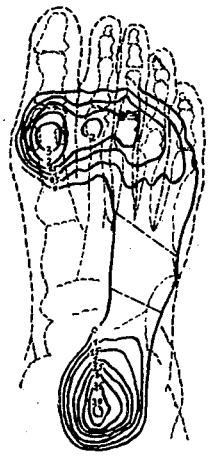
Fig. 5 shows the pressure diagram of a normal foot obtained according to the principles of the present invention.

Figure 5 explains the new method by means of a pressure diagram of a normal foot.

Figure 5 shows the load at the front part of the foot and at the heel, whereas there is scarcely any load in the centre or arch of the foot. In the front part of the foot near the so-called transverse arch there is a uniform drop of pressure from the first line to the fifth.

Figure 6:
Fig. 6 is a similar diagram of an extremely flat foot.

Figure 6 shows the diagram of an extremely flat foot in which, as is well known, the arch has given way and a secondary deformation, namely, a giving way of the transverse arch, nearly always occurs. It can actually be seen that the part between the heel and the front of the foot takes a heavy load and that the transverse arch which usually is scarcely loaded at all is heavily loaded about the second and third lines, that is to say, the transverse arch has also given way.

Figure 7:
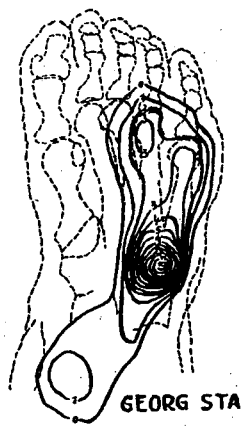
Fig. 7 is a diagram of a club foot.

In the club foot shown in Figure 7 the patient treads almost entirely only on the heel and the outer edge of the foot and the fifth line is especially heavily loaded. A heavy drop in the pressure surfaces at the outer edge of the heel and an excessively heavy load on the fifth line can be seen. As may be seen from the diagram the fifth line takes almost the entire pressure on the front of the foot.

By comparing the old diagram with the new diagrams and the new diagrams with one another, it is quite clear that the new apparatus represents a considerable advance over the conventional devices and that the pressure diagrams show what is expected from them and that it is possible by this method to transfer the pressure diagram not only to the soft parts but even to the bone structure itself.

I claim:

1. Apparatus for measuring the pressure at various points in the surface of contact between a yielding and a substantially unyielding body comprising a support for the yielding body, a pressure measuring device fitted in said support and of a small area relatively thereto, means for moving said pressure measuring device over all points of the surface to be measured, and means for preventing deformation of the surface of contact when the pressure measuring device is moved.

2. Apparatus for measuring the pressure at various points in the surface of contact between a yielding and a substantially unyielding body comprising a support for the yielding body, a pressure measuring device fitted in said support and of a small area relatively thereto, means for moving the pressure measuring device over all points in the surface to be measured, and a thin layer of inelastic material interposed between the yielding and unyielding surfaces for preventing deformation of the surface of contact when the pressure measuring device is moved.

3. Apparatus for measuring the pressure at various points in the surface of contact between a yielding and a substantially unyielding body comprising a support for the yielding body, a pressure measuring device fitted in said support and of a small area relatively thereto, means for moving said pressure measuring device over all points in the surface to be measured, and a thin sheet of paper interposed between the yielding and unyielding surfaces for preventing deformation of the surface of contact when the pressure measuring device is moved.

4. Apparatus for measuring the pressure at various points in the surface of contact between a yielding and a substantially unyielding body comprising a table which is movable backwards and forwards, a rotatable disc fitted in said table, a pressure measuring device fitted in said disc and of small size relatively thereto, and means for preventing deformation of the surface of contact when the pressure measuring device is moved.

5. Apparatus for measuring the pressure at various points in the surface of contact between a yielding and a substantially unyielding body comprising a support for the yielding body, a pressure measuring device fitted in said support and of a small area relatively thereto, means for moving said pressure measuring device over all points of the surface to be measured, means for preventing deformation of the surface of contact when the pressure measuring device is moved, and means for visibly indicating the various pressures measured by the measuring device.

6. Apparatus for measuring the pressure at various points in the surface of contact between a yielding and a substantially unyielding body comprising a support for the yielding body, a pressure measuring device fitted in said support and of a small area relatively thereto, means for moving said pressure measuring device over all points of the surface to be measured, means for preventing deformation of the surface of contact when the pressure measuring device is moved and a mirror operated by said measuring device for visibly indicating on an enlarged scale the pressures measured by the measuring device at the different points in the surface of contact.

7. Apparatus for measuring the pressure at various points in the surface of contact between a yielding and a substantially unyielding body comprising a support for the yielding body, a pressure measuring device fitted in said support and of a small area relatively thereto, means for moving the pressure measuring device over all points in the surface to be measured, a thin layer of inelastic material interposed between the yielding and unyielding surfaces for preventing deformation of the surface of contact when the pressure measuring device is moved, and means for visibly indicating the various pressures measured by the measuring device.

8. Apparatus for measuring the pressure at various points in the surface of contact between a yielding and a substantially unyielding body comprising a table which is movable backwards and forwards, a rotatable disc fitted in said table, a pressure measuring device fitted in said disc and of small size relatively thereto, means for preventing deformation of the surface of contact when the pressure measuring device is moved and means for visibly indicating the various pressures measured by the measuring device.

9. Apparatus for measuring the distribution of pressure at various points in the surface of contact between a yielding and a substantially unyielding body in relation to an inelastic structure within said yielding body comprising a support for the yielding body, a pressure measuring device fitted in said support and of a small area relatively thereto, means for moving said pressure measuring device over all points in the surface to be measured, means for preventing deformation of the surface of contact when the pressure measuring device is moved, means associated with said support adapted to receive and to hold a radiation-sensitive plate underneath said surface of contact without changing the position of said yielding body on said support, and means for exposing said plate to the effect of Röntgen rays through said yielding body.

10. Apparatus for measuring the distribution of pressure at various points in the surface of contact between a yielding and a substantially unyielding body in relation to an inelastic structure within said yielding body comprising a support for the yielding body, a pressure measuring device fitted in said support and of a small area relatively thereto, means for moving said pressure measuring device over all points in the surface to be measured, means for preventing deformation of the surface of contact when the pressure measuring device is moved, there being a lateral slot associated with said support adapted to receive and to hold a radiation sensitive film underneath said surface of contact without changing the position of said yielding body on said support, and means for exposing said film to the effect of Röntgen rays through said yielding body.

11. Apparatus for measuring the distribution of pressure at various points in the surface of contact between a yielding and a substantially unyielding body in relation to an inelastic structure within said yielding body comprising a table adapted to be moved backwards and forwards, a rotatable disc fitted in said table, a pressure measuring device fitted in said disc and of small size relatively thereto, a thin inelastic layer interposed between the yielding and unyielding surfaces, means associated with said table adapted to receive and to hold a radiation-sensitive plate underneath said surface of contact in a predetermined position with respect to the position of said yielding body, and means for exposing said plate to the effect of Röntgen rays through said yielding body.

GEORG STAUDINGER.